United States Patent [19]
DeLucia et al.

[11] Patent Number: 5,494,446
[45] Date of Patent: Feb. 27, 1996

[54] RECEPTACLE MOUNTED, RETRACTABLE, EXTENSION CORD

[76] Inventors: Eugene DeLucia, 4 Cleveland St., Valhalla, N.Y. 10595; Pat Marino, 3300 Polo Pl., Bronx, N.Y. 10465

[21] Appl. No.: 93,934

[22] Filed: Jan. 5, 1994

[51] Int. Cl.[6] .................................................. H01R 39/00
[52] U.S. Cl. .................................................. 439/4; 439/501
[58] Field of Search ................................ 439/501, 502, 439/530, 4, 20, 21, 22

[56] References Cited

U.S. PATENT DOCUMENTS

| | | | |
|---|---|---|---|
| 3,566,332 | 2/1971 | Bonhomme | 439/501 |
| 3,920,308 | 11/1975 | Murray | 439/501 |
| 4,284,180 | 8/1981 | Masters | 439/4 X |

FOREIGN PATENT DOCUMENTS

WO8806353  8/1988  WIPO ..................................... 439/4

Primary Examiner—Neil Abrams
Assistant Examiner—Daniel Wittels

[57] ABSTRACT

An extension cord device is disclosed which has an extension cord electrically connected to an electrically conductive axle assembly. The axle assembly is attached to current taps which plug into an existing electrical outlet. The device is readily mounted into and/or removed from an existing electrical outlet.

4 Claims, 3 Drawing Sheets

5,494,446

RECEPTACLE MOUNTED, RETRACTABLE, EXTENSION CORD

TECHNICAL FIELD

The present invention relates to electrical extension cords used as power distributing devices to appliances. In particular the present invention relates to retractable, receptacle mounted electrical extension cords.

BACKGROUND ART

Traditionally persons in need of electrical current had two options; (1) move to an acceptable electrical receptacle or (2) utilize an extension cord of suitable length to route the electricity to the desired area. In the case of the extension cord many hazards are associated. One of which is tripping over the loose cord that strudels along the ground. Another hazard is the possibility of tangling the unused length of extension cord with other objects in the path of the cord and tipping the objects over. Another problem with the conventional extension cord is the holding force of the electrical receptacle is not strong enough to withstand a small tug from the user of the electrical cord. This results in an interrupted electrical service until the electrical cord is plugged back into the receptacle.

Previously these problems have been approached by manually wrapping the extension cord on a reel or simply coiling it neatly in pile on the ground. Manufactures have used eye-catching colors to warn passers-by of the presence of the extension cord. None of the mentioned solutions have been particularly successful.

BRIEF DISCLOSURE OF THE INVENTION

The preferred embodiment of the present invention is composed of a backing plate that supports the components of the preferred embodiment. The preferred embodiment is slightly larger than a standard electrical receptacle cover found on the walls of most buildings. The backing plate includes holes to accommodate mounting various other components and two axles on which the retracting mechanisms are mounted. The retracting units (2 total) includes a spring and catch system which allows the extension cord to be pulled to any desired length within six feet of the receptacle to which the preferred embodiment is attached. After using the extension cord, the retracting mechanism recoils the extension cord on a reel. This recoil action is initiated by a quick tug of the extension cord. The reels are held on the axle through the use of a screw, nut and washer. The electrical current is transferred through the use of a commutator ring and brush arrangement. The cover of the unit has four sides and a front. When the cover is connected to the backing plate a box is made. Two holes are provided for extension cord access on the sides of the cover. The electrical cord extends through the holes and includes a female plug on the electrical feeding end. This plug also serves as a stop for the recoil action. The retractable unit is attached to the receptacle by a machine screw that extends through the center of the unit and threads into the existing cover screw hole of the receptacle. The screw is tightened after inserting the unit into the receptacle. All of the components with the exception of the electrical conducting components, the retracting spring, and the retaining devices are made of a suitable plastic. The retracting spring is made of spring steel. The electrical conducting devices are made of copper. The retaining devices are made from carbon steel.

DETAILED DESCRIPTION

Figure 1:
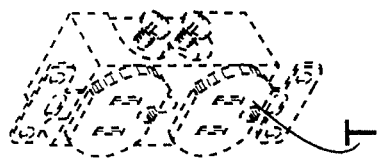
FIG. 1 is an isometric, exploded view of the preferred embodiment. This figure portrays the general orientation of the components of the unit.
Figure 1:
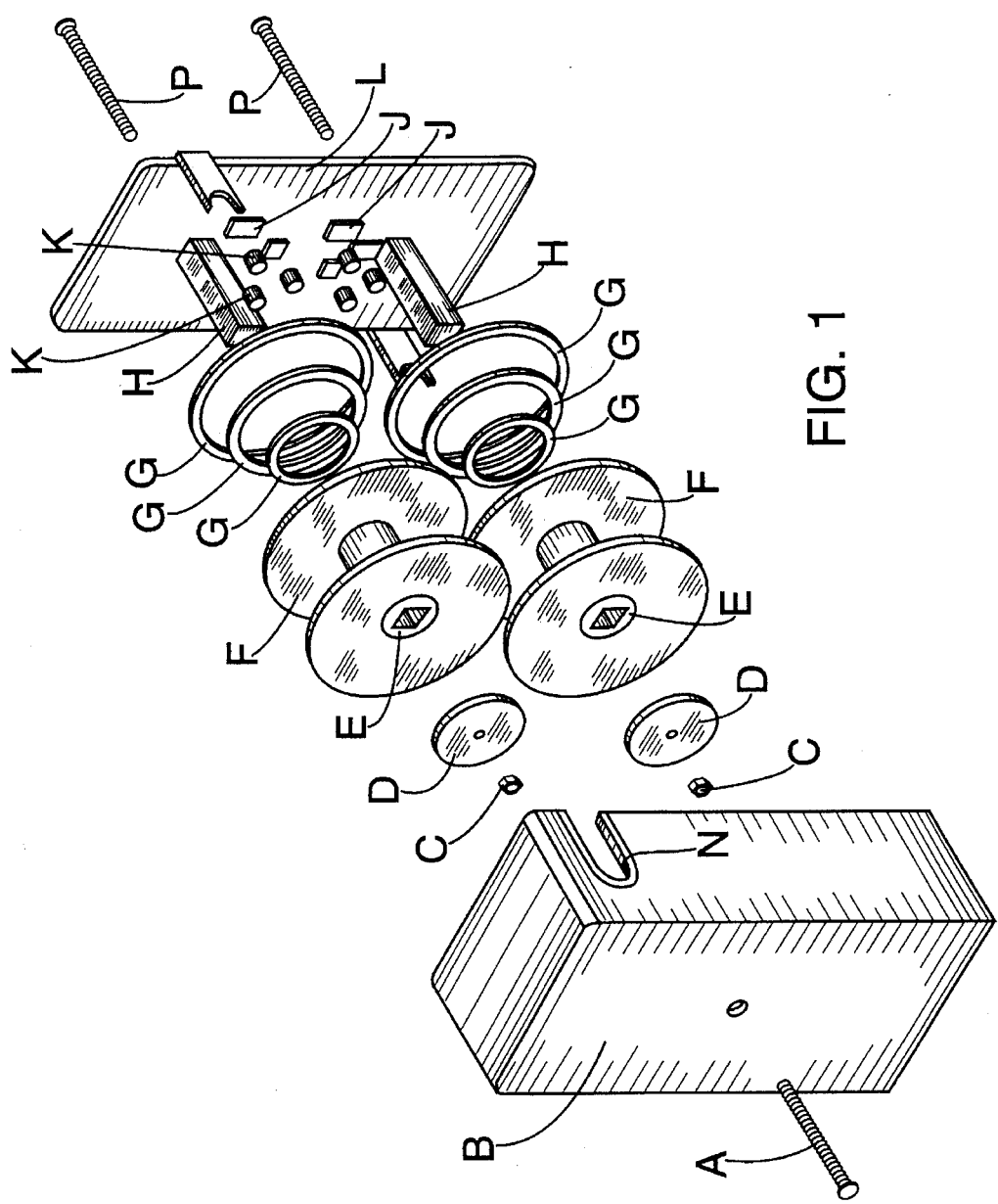
Figure 3:
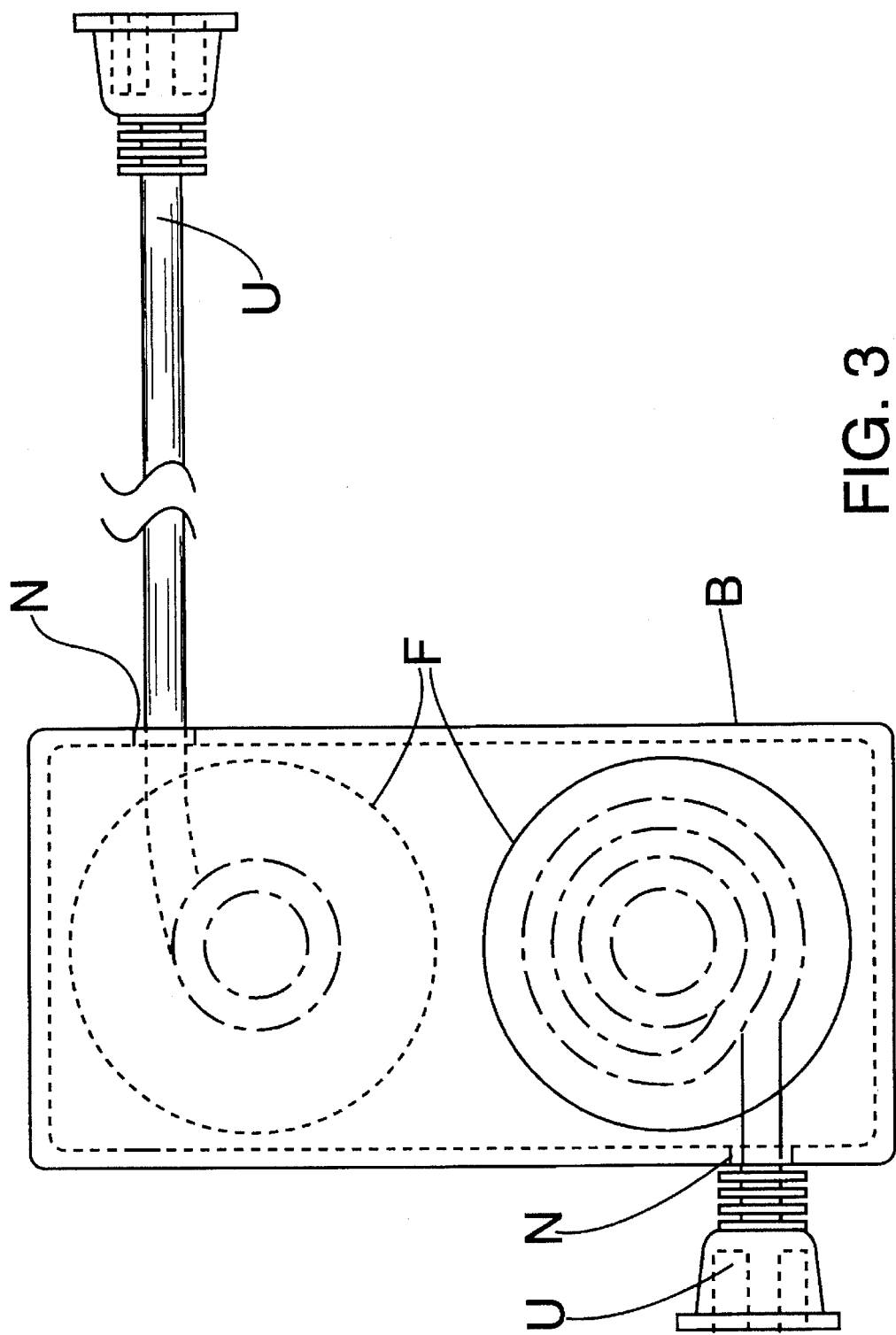
FIG. 3 is a front view of the preferred embodiment with the electrical wire shown. One electrical wire is shown fully extended to the limit of the retracting mechanism The other electrical cord is shown completely retracted and coiled on the reel.

Referring to FIG. 1, the current taps (J) are located in the backing plate (L) by means of a press fit. The bushing axle (H) is integrated into the backing plate (L) and has a hole through the center to accommodate the reel assembly retaining screws (P). The current taps (J) have tabs that are bent flush to the backing plate (L) after press fit assembly is completed. The tabs transfer electricity to the electrical brushes (K). The electrical brushes (K) consist of a carbon plug attached to a spring. The spring exerts linear force on the carbon plug which rides along the radial surface of the commutator ring (G). In order to conduct electricity, the carbon plug must always contact the commutator ring (G), thus the reason for the spring. Note that there are three (3) commutator rings (G) for each conducting wire reel (F), one commutator ring to accommodate each pole of electricity (i.e. positive pole uses one ring, negative uses another ring, etc.). The electrical conducting wire (FIG. 3; U) consists of three (3) individually insulated wires wrapped by an insulating sheath. The electrical conducting wire (U) is connected to the commutator rings (G) through a hot soldier joint. The commutator rings (G) are then attached to the commutator ring with non conductive adhesive. The electrical conducting wire (U) is routed through a hole (not shown) in the side of the conducting wire reel (F) and coiled around the cylindrical portion. The spring assembly and reel bushing (E) are located in the inside diameter of the conducting wire reel (F). The spring assembly (E) includes a catching mechanism that holds the electrical conducting wire (U) in the desired position. The mechanism will recoil with a quick tug of the electrical conducting wire (U). The reel bushing (E) allows the conducting wire reel (F) to rotate radially about the bushing axle (H) while dispersing and retracting the electrical conducting wire (U). The conducting wire reel (F) with the spring assembly and reel bushing (E) inserted slides onto the bushing axle (H). The conducting wire reel (F) is retained against the spring pressure exerted by the electrical brush with spring (K) by a thrust washer (D) and a self locking machine nut (C). The thrust washer (D) and self locking machine nut (C) threads onto the reel assembly retaining screw (P). The reel assembly retaining screw (P) is inserted through the bore of the bushing axle (H). The unit cover (B) has two conducting wire openings (FIG. 3; N) that the electrical conducting wire (U) passes through the unit cover (B) is assembled with the electrical conducting wire (U) placed through the conducting wire openings (N).

Figure 2A:
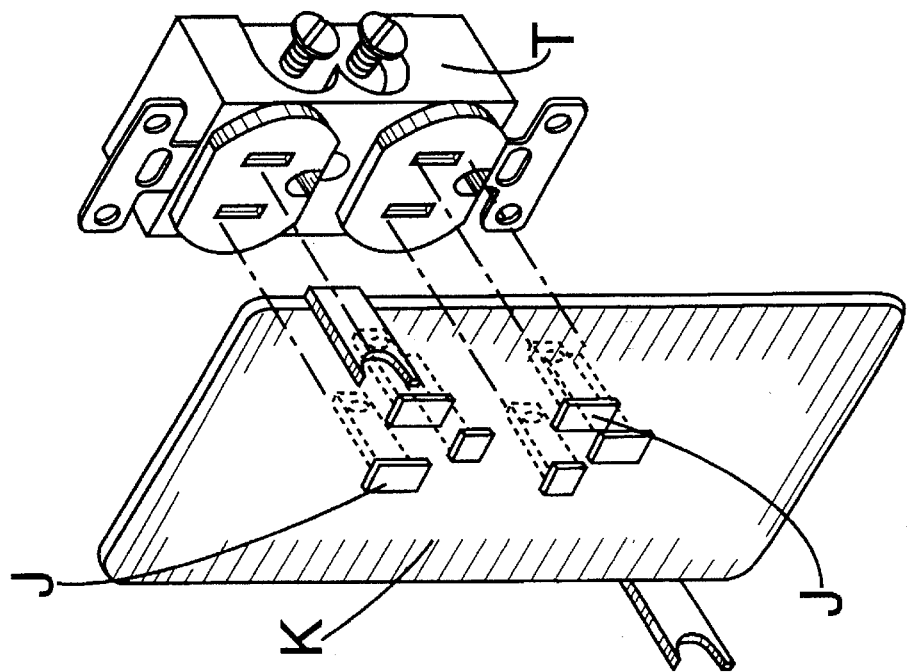
FIG. 2A is an isometric view of the preferred embodiment and an electrical receptacle. This figure depicts the insertion of wall mounted, retractable, electrical, extension cord into an electrical receptacle.
Figure 2:
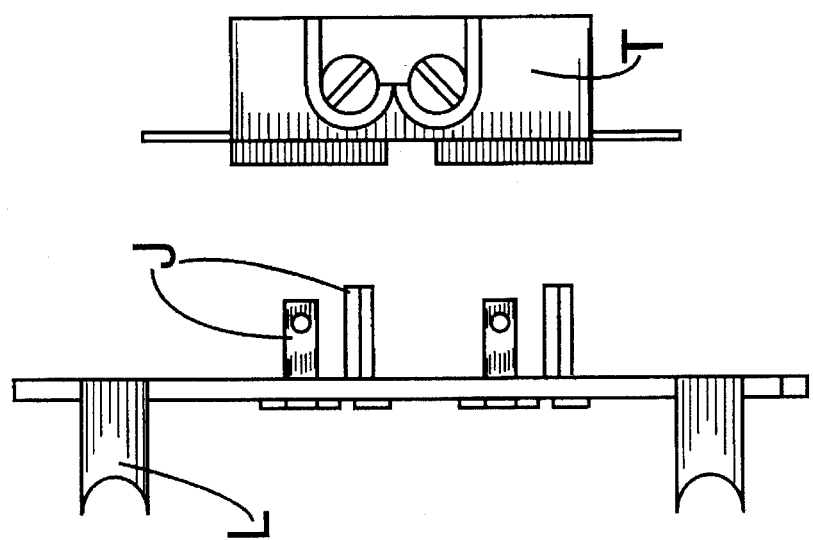
FIG. 2 is a right side view of the backing plate, current tap, and electrical receptacle. This figure clarifies the orientation of the current taps to the backing plate and the electrical receptacle.

The preferred embodiment is mounted by removing the receptacle cover retaining screw from the wall mounted receptacle (T). Insert the current taps (J) into the wall mounted receptacle as shown in FIG. 2 and 2A. The preferred embodiment is retained to the wall mounted receptacle (T) by inserting the unit retaining screw (A) through the hole in the unit cover (B) and threading into the wall mounted receptacle.

We claim:

1. An electrical distribution device capable of being securely mounted on a standard duplex electrical wall outlet comprising:
   (a) housing having a cover and a backing plate;
   (b) two sets of electrically conductive taps extending outwardly from said backing plate, each of said tap sets being adapted to be inserted into both sockets of a standard duplex electrical wall outlet;
   (c) an electrically conductive axle assembly attached to each said tap set, each said axle assembly having a reel, said reel being attached to said backing plate but not to said cover;
   (d) an electrically conductive cord electrically conductively connected to each said axle assembly, said cord being extendable from said housing to a desired length, said cord also being able to be coiled about said reel so as to enclose said cord within said housing; and
   (e) said reel having a locking spring assembly which locks said cord in place after said cord has been extended to the desired length.

2. The device of claim 1 wherein said axle assembly further comprises electrical brushes in contact with commutator rings, said brushes and said commutator rings serving to conduct electricity between said taps and said axle assembly.

3. The device of claim 1 wherein said axle assembly has a retraction mechanism to coil said extension cord around said reel when not in use.

4. An electrical distribution device capable of being securely mounted on a standard duplex electrical wall outlet comprising:
   (a) a housing having a cover and a backing plate;
   (b) two sets of electrically conductive taps extending outwardly from said backing plate, each of said tap sets being adapted to be inserted into both sockets of a standard duplex electrical wall outlet;
   (c) an electrically conductive axle assembly attached to each said tap set, each said axle assembly having:
      (i) a reel, said reel being attached to said backing plate but not to said cover;
      (ii) electrical brushes in contact with commutator rings, said brushes and said commutator rings serving to conduct electricity between said taps and said axle assembly; said electrical brushes comprising a carbon plug in contact with said commutator rings, and a spring to maintain such contact between said carbon plug and said commutator rings; and
      (iii) a retraction mechanism to coil said extension cord around said reel when not in use;
   (d) an electrically conductive cord electrically conductively connected to each said axle assembly, said cord being extendable from said housing to a desired length, said cord also being able to be coiled about said reel so as to enclose said cord within said housing; and
   (e) said reel having a locking spring assembly which locks said cord in place after said cord has been extended to the desired length.

* * * * *